(12) United States Patent
Kalik et al.

(10) Patent No.: US 8,306,921 B2
(45) Date of Patent: Nov. 6, 2012

(54) MOBILE RECOMMENDATION AND RESERVATION SYSTEM

(75) Inventors: Steven F. Kalik, Arlington, MA (US); Hiroaki Sekiyama, Tokyo (JP); Shojiro Takeuchi, Tokyo (JP); Masayuki Kawamoto, Aichi (JP)

(73) Assignees: Toyota Motor Engineering & Manufacturing North America, Inc., Erlanger, KY (US); Toyota Motor Corporation, Toyota (JP)

( * ) Notice: Subject to any disclaimer, the term of this patent is extended or adjusted under 35 U.S.C. 154(b) by 920 days.

(21) Appl. No.: 12/030,340

(22) Filed: Feb. 13, 2008

(65) Prior Publication Data
US 2009/0204600 A1 Aug. 13, 2009

(51) Int. Cl.
*G06Q 99/00* (2006.01)
(52) U.S. Cl. .................................. 705/319; 707/724
(58) Field of Classification Search ............... 705/14.55
See application file for complete search history.

(56) References Cited

U.S. PATENT DOCUMENTS

| | | | |
|---|---|---|---|
| 6,041,305 A | 3/2000 | Sakurai | |
| 6,865,538 B2 | 3/2005 | Chithambaram et al. | |
| 7,027,995 B2 | 4/2006 | Kaufman et al. | |
| 7,071,842 B1 * | 7/2006 | Brady, Jr. | 340/988 |
| 7,152,038 B2 | 12/2006 | Murashita | |
| 2002/0007291 A1 | 1/2002 | Miller et al. | |
| 2003/0097284 A1 | 5/2003 | Shinozaki | |
| 2003/0220981 A1 | 11/2003 | Nakamura et al. | |
| 2004/0064355 A1 | 4/2004 | Dorenbosch et al. | |
| 2004/0162830 A1 * | 8/2004 | Shirwadkar et al. | 707/10 |
| 2004/0181439 A1 | 9/2004 | Kakuta et al. | |
| 2007/0185768 A1 * | 8/2007 | Vengroff et al. | 705/14 |
| 2008/0134053 A1 * | 6/2008 | Fischer | 715/747 |
| 2009/0006194 A1 * | 1/2009 | Sridharan et al. | 705/14 |
| 2009/0106036 A1 * | 4/2009 | Tamura et al. | 705/1 |

OTHER PUBLICATIONS

Yu, S., Spaccapietra, S., Cullot, N., and Aufaure, M.-A. User Profiles in Location-based Services: Make Humans More Nomadic and Personalized. In Proceedings of the IASTED International Conference on Databases and Applications (DBA'04) (Innsbruck, Austria, Feb. 2004). ACTA Press, 2004, 25-30.*

* cited by examiner

*Primary Examiner* — Jonathan Ouellette
*Assistant Examiner* — Maame Ofori-Awuah
(74) *Attorney, Agent, or Firm* — Gifford, Krass, Sprinkle, Anderson & Citkowski, P.C.

(57) ABSTRACT

Apparatus and methods are described for assisting a requestor to identify and reserve a resource that meets the need of the requestor's request. For example, a request can be augmented using augmentation data, such as current position and requestor preferences, and resources are located and ranked according to their match against the augmented request. A person who is the requestor may engage in another attention demanding task, such as driving a car, while resources well matched to preferences are located. Preference data may be determined from social network data, a preference file, and/or other sources.

16 Claims, 4 Drawing Sheets

MOBILE RECOMMENDATION AND RESERVATION SYSTEM

FIELD OF THE INVENTION

The present invention relates to apparatus and methods for assisting the selection of resources, in particular to assisting a vehicle driver to select a resource.

BACKGROUND OF THE INVENTION

In many circumstances, a vehicle driver desires to locate a resource (such as a restaurant, sports center, hotel, parking space, or other goods and/or services), but the demands of driving make it difficult and possibly dangerous to expend much attention on searching and evaluating resources. A similar situation occurs when any person needs assistance to locate a suitable resource, but does not want to (or cannot) expend significant time and effort to locate possible resources and then make a selection. Examples include persons traveling, that might not be familiar with available resources, persons trying to find a resource suitable for a group of persons, persons on vacation that do not want to expend tiresome effort, and any situation where a primary attention demand prevents the person from complex secondary activities.

At some hotels, there are concierges that act as experts to give recommendations and make reservations for hotel guests. However, the level of service depends upon the knowledge of the particular concierge, and is not fundamentally tailored to the interests of the requestor. Reliability is sometimes suspect where an advisor's profit may be influenced by their selections, and the time required to perform these services may still be relatively large. Also, such assistance may only be available to a person physically present at the hotel.

Conventional services require the requestor to explicitly do any calculations necessary to select the timeframe for the reservation to be created. It would be helpful to develop a mobile recommendation system that allows a resource recommendation to be given to a person without significant effort by that person.

SUMMARY OF THE INVENTION

Embodiments of the present invention include apparatus and methods for assisting the selection of a resource, for example a mobile recommendation system within a vehicle using targeted preferences from the driver to locate desirable resources. A resource may be, for example, a parking spot, a ticket (e.g. for an airplane, other transportation, concert, sporting event, movie, and the like), a good (such as consumer good, or other physical item, such as food, medication, electronic device, and the like), accommodation (such as a hotel room), service (such as an appointment with a medical professional), and the like. Selection may include identification of a resource. Optionally, the resource may be purchased and/or reserved, as appropriate.

A person may find themselves in a situation where one or more resources are available to meet a need. However, the determination of which resources are available to meet the need, and the selection of a particular resource from those available, may require considerable effort. Hence, the person may not be able to provide the required attention to search and evaluate resources, in particular if the person is engaged in another primary activity such as driving a vehicle. The need may be expressed as a request, either directed to a person or a computerized system. Even if an assistant is used, the person then has to formulate the request in sufficient detail that the assistant can select appropriate resources. In business situations, a personal assistant may provide some of the search effort needed, but the assistant might not know of the person's preferences.

Embodiments of the present invention include apparatus and methods for assisting a requestor (such as a person using an apparatus according to an embodiment of the present invention), the requestor providing a request for a resource. The request is augmented using augmentation data, which may include additional information, such as positional data (e.g. current position), current time, time of resource need, driving range possible within the time to the resource need, and requestor preference data. Candidate resources are identified and ranked according to their match against the augmented request, optionally using preference data. A requestor may engage in another demanding task, such as driving a car, and select a recommended resource from one or more presented.

Preference data may be determined from social network data, allowing recommendations having at least the reliability of a designated social network or other selected network of customers, people with similar demographics, or designated experts. Preference data may be used to augment a request, and/or rank identified candidate resources.

An example method for assisting a requestor, such as a driver, to select a resource comprises receiving a request from the requestor, determining location data, determining preference data in relation to the resource, determining a spatial search area for the resource using the location data, locating available resources within the spatial search area, ranking the available resources using the preference data, and presenting one or more highly ranked available resources (candidate resources) to the requestor. The requestor then may select a resource, for example by accepting a candidate resource. The position data may include a current position and/or an expected future position of the requestor (or other intended resource user). The preference data may relate to the preferences of a person requesting the resource, preferences obtained from social network data, or preferences of another person (such as a colleague, business associate, known expert, or other person). Reservations may be made, either on acceptance of a suggested resource or as tentative reservations when the available resource is first located. Examples resources include a restaurant, sports facility, gas station, service station, hotel, other service and/or retail establishments, and the like.

DETAILED DESCRIPTION OF THE INVENTION

Figure 1A:
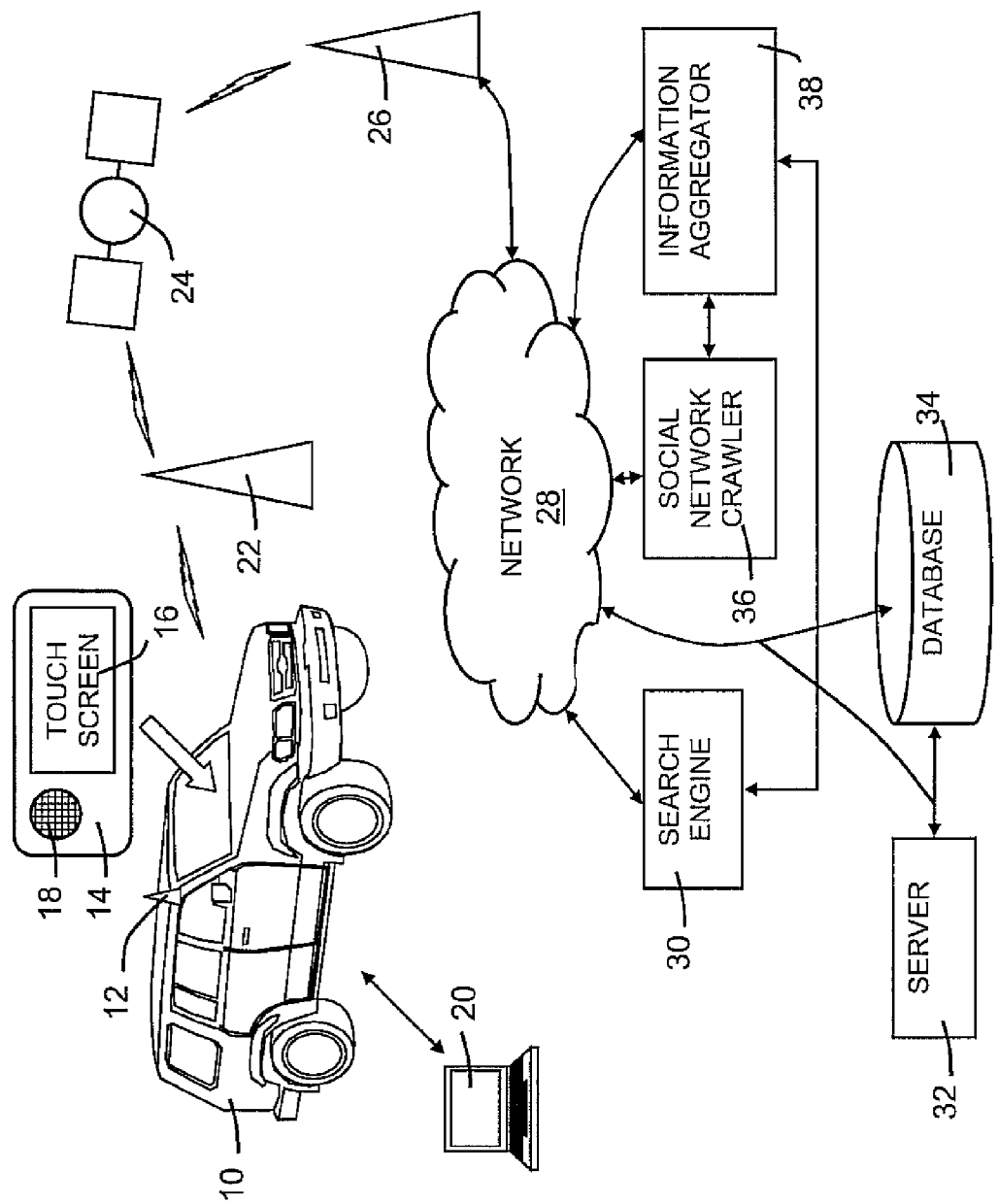
FIG. 1A shows a schematic of a system according to an embodiment of the present invention.

Embodiments of the present invention include systems and methods for helping a requestor find a resource. For example, a requestor (such as a person driving a vehicle) provides a request, the request is augmented using additional information (request augmentation data), and resources are located and ranked according to their match against the augmented request. Attention demands on a person can be significantly reduced compared with conventional approaches, so that the person may engage in another (possibly primary) task, such as driving a car, operating equipment, management duties, and the like. If the requestor is a vehicle passenger and not a driver, there is a potential safety advantage in reducing driver distraction caused by activities of the passenger.

In some examples, the requestor is a person attempting to locate a resource, such as a vehicle occupant (driver or passenger), pedestrian, or other person. In several examples described herein, the requestor is a person that is a vehicle occupant, though these examples are not limiting. In some examples, the requestor may be another electronic device, such as a personal organizer, cell phone, and the like. For example, a person may provide a request to an electronic device, which then may act as the requestor, possibly at a later time. For example, a person may provide a request to an electronic device in advance of resource need, and the request is then provided by an electronic device at a predetermined time.

A mobile recommendation system according to an embodiment of the present invention minimizes attention demands on a person attempting to locate a resource, and may make one or more recommendations (and optionally reservations) without needing further attention from the requestor, normally required to make such determinations.

An example system may include a mobile location sensor (GPS), online route traversal prediction, online or human mediated resource availability estimates, email/SMS/other messaging based request and information passing systems, a database or other source of online social network data or other opinion data, compiled preferences for an individual person, and preference data determined from request and resource rejections from the requestor.

An example partially or fully automated system allows integration of various information sources to determine preference data, resource availability, and optionally to make reservations, negotiate discounts, or to perform other purchase-related activity. Example resources include sports venues (such scheduling a tennis match at a tennis court), restaurant reservations, meeting requests, entertainment (such as movies, theater, professional sports events), and the like.

Example systems allow the facilitation of resource identification, resource recommendation, and resource reservation and/or purchase. A recommendation system may leverage searches over opinion based systems, particularly including the opinions of members of a social network to which a requestor belongs, or other social network. Distraction to the person can be significantly reduced. Embodiments of the present invention allow identification of available resources that fall within some desirable criteria.

For example, a person traveling may require a recommendation and optionally a reservation for dinner. A system according to the present invention may determine a range of dinner times acceptable to the requestor, a current position, a spatial search area (e.g. based on a range of driving times) in which resources are searched, and recommend a restaurant using preference data associated with the requestor.

Embodiments of the present invention may allow one or more of the following several advantages. Time-consuming scheduling and reservation tasks are offloaded from a person and (possibly) automated. Personal or group preference matching to available resources is improved through the augmentation of requests and/or ranking using additional data, such as preference data, position data, and the like, allowing recommendation and selection from otherwise equally acceptable resources.

Preference data may include data determined from interviews of a person acting as the requestor, social network or other human network based preference recording, previous choices, recommendations by trusted parties, and the like. Planning and allocation processes are accelerated through the use of implicit and recorded preferences and opinion statements as well as through the use of electronic communication to speed up resource selection and reservation. Improved efficiency in locating a resource reduces time and attention demands on a person, improving the safety of the person and those around them. Using preference data to augment the request and/or rank identified resource options, satisfaction with recommendations may be increased. Examples of the present invention allow improved efficiency in developing plans, negotiating with others involved in those plans, and identifying and using personal preferences in the development of those plans.

FIG. 1A illustrates operation of an example system according to an embodiment of the present invention. The figure shows automobile 10 having on-board GPS system 12 (here, an external antenna being indicated), possibly part of a vehicle navigation system. An interface 14 within the vehicle comprises a touch screen 16 and a microphone 18. An electronic circuit associated with the vehicle is in wireless communication with the Internet (28) and/or other computer networks, and optionally in communication with one or more personal electronic devices such as laptop 20. A wireless modem (not shown) may communicate with the Internet 28 (or other computer network) through any available method, for example through antennas 22 and 26, and/or satellite link 24.

Through a communications link, in this example a wireless link, an electronic circuit used to perform the operation can access a search engine 30 (for example, to initiate a search of a computer network for resources or other relevant data, and retrieve results therefrom), one or more servers 32 (for example, to provide further computational power), one or more databases 34 (for example, to access or store relevant information), a social network crawler 36 (to extract preference data from social networks), and information aggregator 38 (to collect information relevant to preferences and/or resources).

In this example, the interface includes a microphone and a touch screen. The microphone may be combined with voice recognition software to recognize requests given by speech only. A visual display (possibly the same device as the touch screen), synthesized speech, or other device may be used to present resource options. An interface including a request input may comprise a microphone and a voice recognition system, keypad, keyboard, or other mechanism operable to receive a request. A request input may also comprise a communications link to another electronic device, such as a computer system, that provides the request. An apparatus according to an embodiment of the present invention may comprise a wireless modem, and the request augmenter and the search system may both use the wireless modem to access a computer network such as the Internet. A requested resource can be reserved and/or purchased on behalf of the requestor over a computer network.

In this example, a social network crawler 36 is used to obtain preference data relating to the request. Information may be collected before the request is made, in particular for common or expected requests. The information aggregator 38 collects preference data extracted from the social network data.

The database 34 provide further sources of information to augment the request, such as further social network data, bulletin board data, other on-line communications, information resources such as on-line reviews and data, data previously communicated by a requestor or other persons, resource-related web pages (such as restaurant web pages), and the like. Preference data can also be obtained from previous choices, which can be stored in memory, either in a location associated with the vehicle or in a remote location such as database 34.

Figure 1B:
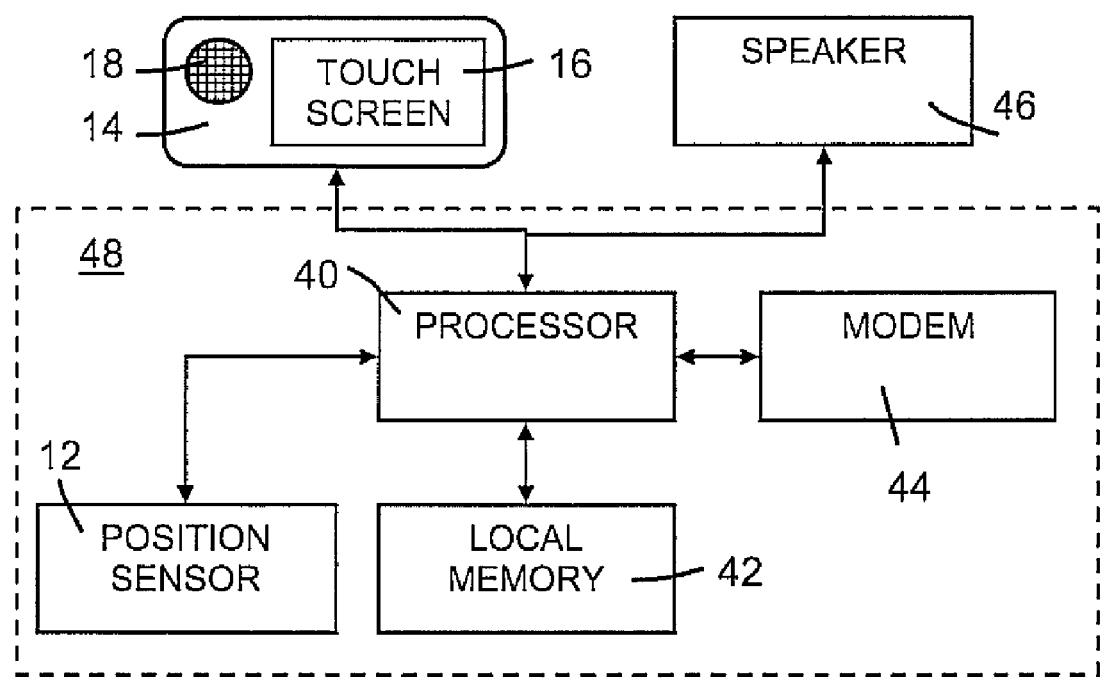
FIG. 1B farther shows a schematic of a system according to an embodiment of the present invention.

FIG. 1B shows a schematic of an example apparatus. The apparatus includes a user interface 14, an (optional) audio output device 46, and an electronic circuit 48 comprising processor 40, local memory 42 (RAM and/or ROM), position sensor 12, and a modem 44. In this example, the user interface 14 comprises a touch screen 16 and a microphone 18, as discussed above in relation to FIG. 1A, operable to receive a request input. However, other request input devices may be used, either in addition or alternatively. In this example, the modem 44 is a wireless modem, operable to connect to an information network such as the Internet. For vehicle use, a wireless modem may be used. Example apparatus may also be used outside a vehicle, and a wired connection to a network may be used.

The electronic circuit may be provided by a device having additional functionality, such as a mobile phone, computer, personal digital assistant, and the like.

In other examples, a separate position sensor may be used, providing a position signal to the electronic circuit. For example, an apparatus may be located within a vehicle, receiving a position signal from an in-car navigation system. The audio output device may be a component of an in-car entertainment system. An apparatus may use an interface provided by an in-car entertainment system, navigation system, cell-phone, personal digital assistant, or some combination of interfaces, to receive the request.

Figure 2:
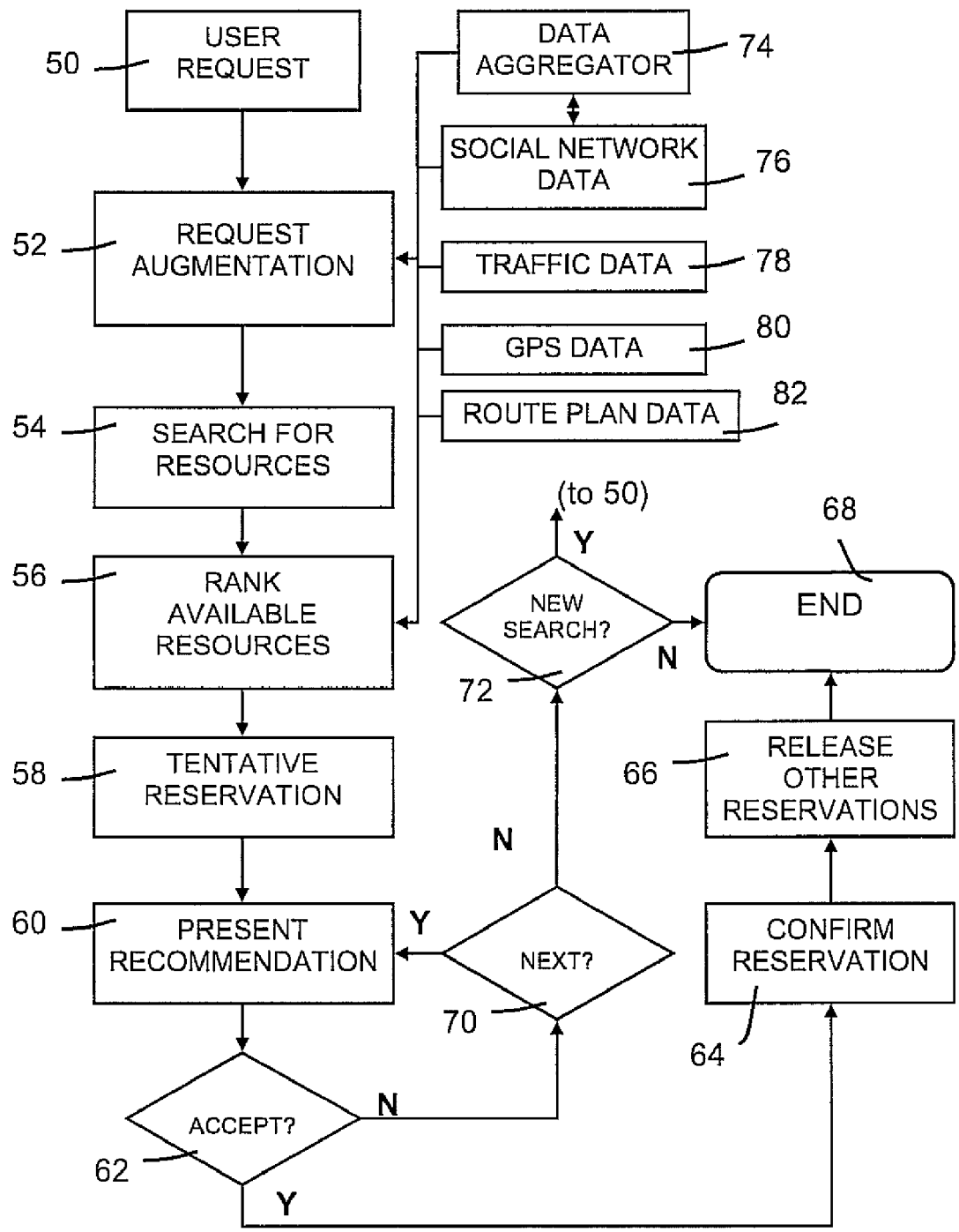
FIG. 2 shows an example flow chart for a method according to an embodiment of the present invention.

FIG. 2 shows a simplified flow chart of an example process. The process includes receiving a request from a requestor (50), augmenting the request with augmentation data (52) obtained from one or more sources, searching for available resources (54), ranking available resources (56) using preference data obtained from one or more sources, making one or more tentative reservation(s) (58) for one or more high ranked resource(s), and presenting a recommendation (such as the top ranked available resource) to the requestor (60).

The requestor may choose to accept or reject the recommendation (62). If accepted, the corresponding tentative reservation is confirmed (64), any other tentative reservations released (66), and the process ends at 68. If the requestor rejects a recommended resource, that resource is removed from the list of available resources and the requestor is asked if the newly top ranked resource should be presented as a recommendation (70). If not, the requestor may be asked if a new search should be performed (72). If a new search is required, a request is again received (50), otherwise the process ends (68).

In this example, the request augmentation data comprises data obtained from one or more social networks (76), obtained after aggregating relevant data using a data aggregator (74), traffic data (78), positional data obtained from a GPS (80), and route plan data (82). The data obtained from social networks and traffic data can be obtained from the Internet over a wireless data connection.

For example, the request augmentation data may comprise positional data obtained from a GPS or other position sensor. The search may then be limited to a spatial area correlated with the position data. The size of the spatial area may be predetermined or calculated at the time of request. For example, the spatial area may include resources within a particular distance (e.g. in the form of driving distance or journey time) of the present position, or within a particular distance from a projected future position. For example, a person traveling may request a hotel for a certain arrival time, allowing the search request to be augmented with a spatial area corresponding to the projected position at the desired arrival time. Request augmentation data may further include data from other sources not shown in this figure, such as time of request.

Request augmentation data may also be used to exclude resource options. For example, a requestor may previously request that certain resource brands or types (such as specific restaurant or hotel chains) be excluded from a search, so that any future search requests may automatically exclude such resource brands. A requestor may indicate, either before or during the request, that only certain resource brands (e.g. selected trademarks or service marks) or resource types (e.g. business hotels, fine dining restaurants) are to be included in a search for a particular resource need, and similarly brands or resource types may be excluded from the search.

For example, a request for a "hotel" may be limited to particular brands, or to "business type" hotels only. This limitation may be performed without the request including such information, using preference data to augment the request with such limitations. A system may also exclude, denote, or otherwise reduce the relative preference value of a resource brand if that brand is rejected as an acceptable resource more than a predetermined number of times.

If no resources are found matching the augmented request, the request may be modified to include a larger spatial area, or resource brands or types not previously considered. Feedback to the requestor may indicate a failure to locate a suitable resource.

In some examples, the requestor may not be the planned resource user. In such cases, the preference data and/or other augmentation data (such as position data) used may be related to the intended resource user. For example, the current or future location, and preferences, of an intended resource user may be determined electronically, for example using local data or and/or data available over a network, so as to assist the identification of resources for the intended resource user.

Ranking of available resources may use preference data from similar and/or different sources of data as used for request augmentation. In some examples, social network data is used for ranking available resources. For example if the requestor is a member of a social network, recommendations from other members of the social network may be used to rank the available resources.

Tentative reservations (58) may be made for the top ranked resource, or for some number of top ranked resources. Alternatively, reservations may be made only after a recommended resource is accepted. In other examples, the requestor selects a resource from a list of alternatives.

The process may be fully automated using a computer system, using, for example, an electronic circuit with processing capabilities within a vehicle, or in a portable device, and having a wireless Internet access. In some examples, human assistance may also be used. For example, the ranked list of resources may be provided to a human assistant, such as a human operator that calls the driver with recommendations, discusses them with the driver, and makes reservations using the driver's choice.

Figure 3:
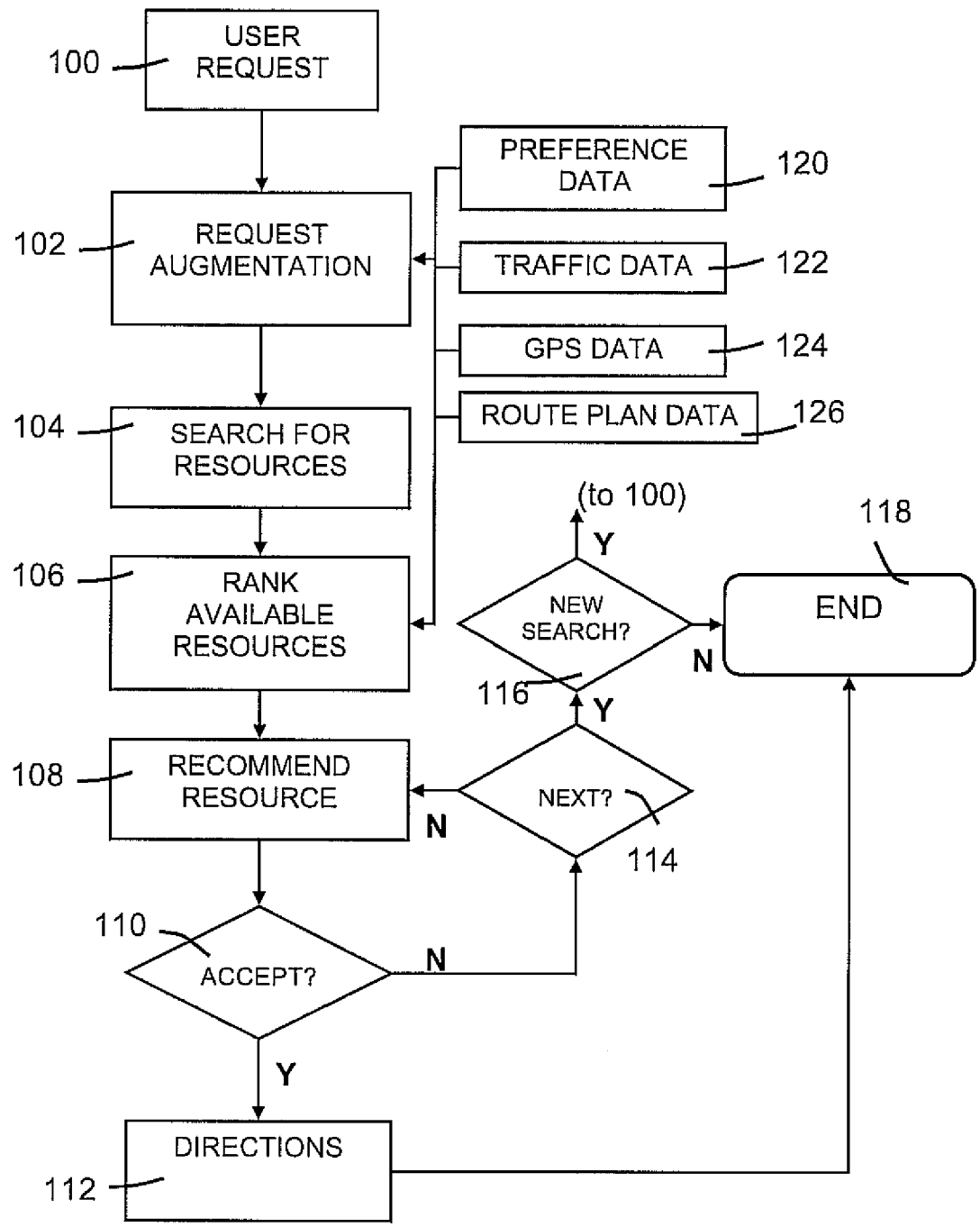
FIG. 3 shows a flow chart of an alternative approach.

FIG. 3 shows a further simplified flow chart of an example process. The process includes receiving a request (100), augmenting the request with augmentation data (102), searching for available resources (104), ranking available resources (106), and presenting a recommended resource (the top ranked available resource) to the requestor (108). Request augmentation and/or resource ranking may use previously or concurrently collected data such as preference data 120, traffic data 122, position data (such as GPS data) 124, and route plan data 126. The requestor chooses to accept or reject the recommendation (110). If accepted, the requestor is provided with directions to the selected resource using an in-car navigation system (112), and the process ends at 118.

If the person rejects a recommended resource, that resource is removed from the list of available resources and the requestor is asked if the newly top-ranked resource or small set of resources should be presented as a recommendation or recommendations (114). If not, the requestor is asked if a new search should be performed (116). If a new search is required, a request is received (100), otherwise the process ends (118).

RESOURCE EXAMPLES

A resource may be, for example, a travel resource (such as a parking spot, a permit to enter a restricted city traffic system, fuel supply, time slot to pass through an intersection, a transport-related reservation e.g. for an airplane ticket or other reservation such as a bus, train, or ferry reservation), other reservation (such as a concert, sporting event, movie, other entertainment event, and the like), a good (such as consumer good or other physical item, such as food, medication, electronic device, and the like), accommodation (such as a hotel room, or other space), facility (such as meeting room, conference facility, fitness center, other business or health related facility, and the like), personal service (such as an appointment with a medical professional, massage, class, training opportunity, and the like), and the like. Some examples may fall into one or more categories. Examples resources further include reservation of a commercial item (such as clothing, equipment, and the like) to examine or try before purchase at a store, supplier of any tangible object such as flowers, edibles, and the like, other service items, other transportation services, and the like.

Hence, a resource may include any supplier of goods and/or services. Particular examples include suppliers of goods and services associated with travel, business, leisure, and the like.

Request Input

A request input receives a request from a requestor. The request input may comprise, for example, a microphone in combination with a voice recognition system, touch screen, keyboard, keypad, eye-tracker, some combination thereof, and the like.

Synthesized speech can be used to provide feedback to the requestor, such as repeating the request for confirmation purposes, asking for additional information (e.g. to supply a last name for an ambiguous first name given for a colleague), and the like.

Request Augmentation

A request can be augmented with augmentation data, which may comprise additional information obtained from one or more other sources. For example, a request may be augmented using position data to define a spatial area in which to search for resources. In some examples, the augmentation data may be determined from information, such as preference data, collected before the request is made, allowing a request to be augmented without further demands on the requestor at the time of request. Augmentation of a request allows better identification of resources likely to be acceptable to the requestor, without placing further demands on the attention of the requestor, and may be done automatically.

A spatial area, within which the resource is searched, can be determined from time data and positional data. Time data includes the time and day of request (e.g., obtained from a clock), the time of resource need (specified within the request or otherwise determined), and statements within the request such as "soon", "after lunch", "within an hour" which can be converted to time ranges. A person may request a resource at a particular time, a future position estimated for that time from speed and heading information, and a spatial area for the search determined using the future position.

Positional data may include a current position (for example, from a global positioning system (GPS), cell-phone triangulation data, or other position data), trip plan data (for example, preprogrammed, determined from a final destination, or determined from heading and speed data) from which a position at a given time can be estimated (for example: usual commuting route data, or a predetermined destination or heading), position of other colleagues sharing the resource (if appropriate), and the like.

As a representative example, a person requests a dinner reservation. The time of resource need can be estimated to be within a typical window of time within which the person prefers to eat dinner, for example between 7 pm and 8 pm. This time window for resource need may be determined from previously collected preference data. Unusual traffic conditions (including adverse weather and other delays) may be used to further restrict the search in space, time, or over other appropriate dimensions.

Examples of the present invention allow integration of information originating from several sources, where the information held by these sources can be initially produced or compiled at one or more times, and may also be updated over time. These sources can include, but are not limited to: a mobile location sensor; up-to-the-minute route travel predictions; machine or human mediated resource availability estimates; email, SMS, or other messaging based request and information passing systems; on-line social network and opinion databases; compiled preferences for a requestor; direct requests and acceptances or rejections from the requestor; and other publicly or privately available data sources to which a user has access that can be provided to a recommendation and reservation generating agent. Preference date may be determined from historical data, including previous requests, and may be updated in real time during a request. Request augmentation data (which may include position data, travel conditions, and the like) may be updated at intervals, and may be updated to obtain as current data as possible at the time of the request.

After a request is accepted, in some examples of the present invention the feasibility of the request may be monitored. For example, if updated travel conditions indicate that it is no longer possible to reach a desired resource by a particular time (for example, reach a restaurant by a reservation time), a person may be asked to reconfirm the acceptance, or provide a revised request. In some examples, an updated reservation time, or other modification to request details such as reservation time, may be obtained automatically. For example, current travel data may be used to obtain better time of arrival estimates, and a previous reservation time may be revised automatically, optionally on approval by the requestor. The requestor, and any other person having an interest in the request, may be notified of the new time automatically.

If the resource is to be used by a plurality of participants, such as a number of business colleagues, the locations of each participant can be used to improve the ranking or to further constrain the selection of resources available to achieve the requested goal. The search area can be further weighted using the relative status of the participants. Weightings may be used when ranking resource options against the request. Available resources within the search area are identified, and a selection made using preference data, so as to minimize travel time (an implied preference), or using other data. The resource can be reserved, and the participants notified of the resource choice. The reservation may be before or after confirmation of the selection.

Request augmentation data may also include data determined from preference data relating to the resource need, which is discussed in further detail below. For example, a request may be limited to types of resource, based on previously collected preference data.

Preference Data

Using a social network or other network of opinions, the service, recommendations, and arrangements can be tailored to the requestor's interests even without the explicit recognition of those interests, because of the inherent biases implicit in the selection of a particular advising network, even when those biases (preferences) might otherwise be more difficult or time-consuming to explicitly state or identify.

Preference data can also be obtained from one or more on-line social networks. Any computerized social network may be used. Weighting can be scaled according to position in the network, optionally in a variety of ways. For example, the highest weighting may be given to postings in the person's name, and for other postings the weightings may be scaled by proximity to the requestor in the social network. In another example, a response to a requestor comment may be scaled by a factor of 0.5 or other scaling factor less than one, and more remote relationships scaled by a smaller factor.

One or more social networks may be crawled to aggregate information relating to the requestor preferences. Text analysis of aggregated social network data, using conventional intelligent text analysis (or text mining) methods, allows preference data to be extracted. Analysis operations may include categorization of terms (such as sports, food, and the like), clustering of related terms, sentiment analysis, and relation modeling between group members to determine relationships with the requestor for opinion weighting.

In some examples, the preferences of one or more persons other than a requestor may be used as a source of preference data. The other person(s) may be selected as having overlapping preferences for already known requestor preferences (to predict future preferences), similar demographic data, and/or identified as a trusted source of opinions to the requestor. For example, the other person(s) and the requestor may be a member of the same social networking group.

Search terms may be grouped by category, and search terms in the same category as the request term used to locate resources and/or preference data. For example, tennis is a search term for racket sports, and associated terms might include badminton and squash. The relative importance of results obtained using associated search terms can be scaled according to the relationship with the original term used in the request. Hence, if the original request is for pizza, a high recommendation for pizza carries a higher weight, in preference data and resource ranking, than a high recommendation for another form of Italian food. A graph (directed or undirected) may be created for associated words or search terms, and weightings for search results weighted based on proximity according to a variety of methods familiar to those skilled in these arts.

A system according to an embodiment of the present invention may be self-training, improving at least partly by aggregating the requestor selections over time to improve prediction of future preferences as the system is used. A questionnaire or other method of acquiring and entering opinion data into an electronically accessible database can also be used for the direct collection of preferences.

An interview process can be given that requires largely explicit statement of the requestor's preferences, and the data stored in a preference file. The preference file may be located in memory of an electronic device associated with the vehicle, a portable electronic device carried by the person, or accessible over a network.

Preference data may also be inferred from demographic data supplied or otherwise determined related to the requestor. For example, comments and recommendations from a social network of retired people, or organization for older people, may be given greater or less weight according to the age of the requestor. This application of demographics can extend from traditional, heuristically selected sets like age, to even randomly-generated or arbitrarily created sets using techniques familiar to those skilled in the art of marketing and data-mining.

Preference data may include long-term preferences of the person, independent of the request, and short-term preferences and requirements relating to a specific request. For example, a specific request for a dinner reservation today indicates a requirement that a restaurant be open the day of the request, which can be used to exclude certain resource candidates. A term such as "something different" can be used to exclude recently used resource options.

Preference data may be used to rank resources, and may also be used to augment requests before a search is made. For example, a search may be made more specific, such as by exclusion of possible resources, using preference data.

Resource Search and Ranking

A resource search may use a conventional search engine, such as Google™, for example specifying the search area in terms of a town, area, zip code, or other method. A proprietary search engine may be used, for example as provided by a service provider. A resource search takes the request, optionally augmented using augmentation data, and retrieves resource identities matching the request. Resource ranking then may use preference data. Searches may be augmented using alternative or other related terms in a search, for example using a thesaurus, and preference data can be used to weight such alternative terms.

After retrieving the identity of resources from the search engine, the resources are then evaluated based on available data, including preference data determined for the requestor. A number of resources may be identified within a given search area.

The resources may then be searched (for example, by name) on the Internet, such as within social networks, business evaluation sites, review or tourism sites, or by other approach to obtain additional resource data. Additional third party tools for evaluating resource availability and for reserving resources (for example: orbitz.com, expedia.com, and the like for travel related ticket services, hotels.com for lodging related services, opentable.com for restaurant related reservation services, and other on-line service providers as appropriate and specific to these and other resources as will develop over time) may be used to facilitate ranking of possible selections in addition to their application in ultimately reserving or requesting the requested resource as described in the section below. Depending on the resource, these may include special features, demographic appeal, reviews, health code violations, opening times, and the like. Resource data can then be compared with preference data, and resources ranked according to the comparison.

In some cases, preference data relating to another person may be used for resource ranking and/or request augmentation. For example, a person planning to meet a business contact may request a resource to be identified using preference data associated with the business contact. An administrative assistant may use preference data related to a particular businessperson. A requestor may create difference preference data files for different business contacts. A request may be made in the form "I need a [resource] for [person identifier]", the relevant preference data being automatically used to locate and rank resource options.

Resource ranking may further include considerations such as a business relationship with a resource (such as a relationship between an Internet service provider and/or search engine provider and a resource), possession of physical or electronic coupons, and the like.

Resource Selection and Reservation

In some examples, a tentative reservation is made for a selected resource without any need for further input by the requestor. The requestor is asked to confirm the reservation, which can then be canceled if the requestor does not approve the selection. Tentative reservations may be required in cases such as resources provided through ticketing services. In such cases, the tickets available will otherwise be offered to other requestors unless the system agrees to hold them temporarily as a reservation, to permit an answer to be returned from the requestor accepting or rejecting acquisition of the proposed resource.

In some examples, a single resource option is presented to the requestor. This resource may have a good match to preference data, possibly the highest match. Alternatively, two or three options are presented to the requestor, who then selects one of the resource options. A system may interact with an automated (e.g. on-line) reservations system associated with the resource. A reservation code may be stored by the system, and displayed to the requestor when required.

On-line reservation systems may be configured to allow short-term tentative reservations, in order to improve business volume and cultivate customer goodwill. A tentative reservation may only last for a few minutes, before it is either abandoned or converted into a full reservation.

Automobile Applications

Some or all of the functionality of the system may be provided by a portable electronic device (such as a personal digital assistant (PDA), cell-phone, laptop or other portable computer, or other device) that is carried on or integrated (potentially transiently) into a vehicle. An electronic device may interface with a navigation system on the automobile to provide directions to the resource.

A navigation system, such as a GPS system, may provide position data. A navigation system may provide route planning, and planned routes may be used to estimate a future position of the vehicle, for example using estimated driving times, traffic conditions, and the like.

Other Applications

Embodiments of the present invention may be implemented on any portable electronic device. In some examples, an electronic circuit associated with the automobile interfaces with the portable electronic device to provide or assist in the provision of the functionalities described herein. Further applications of embodiments of the present invention include identification of sales prospects, interpersonal relationships such as dating, and assistance with house viewing and purchases, as well as others that will be obvious to those versed in the arts of data mining, information aggregation, or marketing.

Example 1

A person, driving in a vehicle with a passenger, requests a tennis court that will be available for at least 1 hour, located within a 20 minute drive of the present location. The system determines the driver's position from using current position data (for example, from a GPS device or cellphone), determines a search area within 20 minutes drive of the current position (possibly accounting for traffic conditions and weighted based on present heading), searches for tennis courts within the search area, ranks available courts against the person's preferences, and presents a recommendation to the driver. The driver accepts or declines the recommendation, either explicitly through a response or implicitly through another action or request, with other recommendations being made if the recommendation is declined.

The preference data relating to tennis courts may be determined from previous acceptance or rejections of recommendations, memberships of sports clubs, recommendations by on-line social networks, on-line reviews, or other source of data. Electronic confirmations of availability from a server associated with the sports facility may be used as a sign of confirmed availability, and a resource with confirmed availability status may be more highly ranked as a result.

Example 2

A person, returning from a previous engagement wants to arrange to play tennis with a colleague for 45 minutes to 1.5 hours, and to be finished with the tennis within 3.5 hours of the time of the request. These demands place specific restrictions (constraints) on the time resource to be allocated, and by propagating these constraints back through the planning process, upon the locations and times at which the tennis can be played.

An example approach is as follows. The search area is determined using the current locations and travel conditions of the person and the colleague. Candidate tennis courts are identified in the search area and polled electronically to determine which ones have time available within the range of the request. The preferences of the person and/or the colleague are scraped from their postings to one or more social networks. Alternatively, a consensus (or other summary) preference can be determined from the social networks to order amongst potentially otherwise equivalent tennis court resources to support the selection and reservation of a particular court.

The colleague can be contacted electronically to request the meeting for tennis at the selected court at the time reserved. The colleague's electronic reply can be received and incorporated to finalize the plan, or to identify required or requested changes to the plan. The process can be iterated notifying the requestor only when necessary to permit changes to the originally identified plan (for example: "The colleague declines the location, requesting alternate. Alternate is available and can be reserved. Do you accept this change, or would you prefer to cancel request, review available locations, or find a different colleague with whom to play?")

Reviewing the social network information, alternate potential colleagues can be found within the social network, and again the process can be iterated based on network-stated preferences and current locations for both parties, with the bulk of the search, negotiation, and reservation processes taking place without or with only minimal requestor interaction required.

Example 3

A person, driving a vehicle, requests a restaurant with exceptional lasagna between the present location and home that can provide the lasagna for carry-out by the time a vehicle leaving 10 minutes from now would reach their location. The time data is used to estimate location, and hence a search area, for the resource. A conventional search engine, such as Google™, is used to locate resources within the search area. Usual driving times can be used to determine search area, optionally modified by real-time traffic flow data.

Search terms may be grouped by category, and search terms in the same category as the request term used to locate resources and/or preference data. For example, the request for lasagna enables other Italian food terms to be used in a search, such as "pizza". A resource supplying pizza and lasagna, with pizza highly recommended within social group data, can be more or less preferred than a resource supplying lasagna that contains no recommendations for or against any category of food, depending upon a users preferences for such situations. The use of associated search terms to obtain preference data and/or resource data is a feature of some examples of the present invention. The relative importance of results obtained using associated search terms can be scaled according to the relationship with the original term used in the request. Hence, a high recommendation for lasagna carries a higher weight, in preference data, than a high recommendation for pizza, if lasagna is the search term used.

Example 4

A person requests a restaurant with excellent lobster that could have a table for 5 ready within 30 minutes of the current location. A system according to an embodiment of the present invention can make reservations and recommendations for a requestor, using the present location and driving times to define a search area, and recommendations based on preference data extracted from a social network to improve the likelihood of recommendation acceptance.

Other Examples

An example method for selecting and optionally reserving a resource comprises: receiving a request for the resource from a requestor; determining a location for using positional data, determining preference data in relation to the resource, where the preference data may be determined from one or more additional data sources; determining a spatial search area for the resource; locating available resources within the spatial search area; ranking available resources using the preference data; and presenting one or more highly ranked available resources to the requestor so as to assist the requestor to select the resource.

An example method for assisting selection of a resource in response to a request from a requestor, such as a vehicle occupant, comprises obtaining position data, the position data being obtained electronically from an electronic device associated with the requestor, such as a position sensor, for example a GPS or other position sensor within a vehicle navigation sensor. Resource options consistent with the request are identified by searching a computer network such as the Internet, and the resource options can be limited to a spatial area determined using the position data, for example centered on a present position, or centered on a future position. A future position may be estimated using time, speed, and heading data, a route determined towards a target destination, for example beyond the resource, personal organizer entries, and the like. Resource options may then be using preference data, so as to identify a candidate resource. Preference data may be collected at least in part from an on-line social network. Candidate resource may then be presented to the requestor, so as to assist selection of the resource.

The requestor may be a user of the system, such as a person, for example a person on board a vehicle, such as a driver of a vehicle. In some examples, a requestor may also be an electronic device, for example a computer system or other electronic circuit, such as an electronic device on board a vehicle. For example, the request may be provided by an electronic device according to a previous input, for example at a predetermined time.

Preference data may be at least in part obtained from an on-line social network associated with the requestor, such as from an on-line database. Preference data can be obtained by aggregating one or more preferences within a social network associated with the requestor, for example by aggregating a preference within a social network that is substantially similar along one or more identifiable data dimensions to one associated with the requestor, even if the requestor and their social network are not directly connected to the utilized social network.

A spatial search area may be determined using the present location and the time for using the resource. For example, a GPS or other position-determining system may be used to provide a position signal, and a clock used to provide a time signal. The position signal may be stored as a function of time to allow projection of a future geographical area in which the resource is preferably located. A reservation can be made for the requested resource, and may be released if the found resource is not confirmed. A reserved resource may be purchased on behalf of the requestor.

An example apparatus for assisting a requestor to select a resource comprises an interface, operable to receive a request from the requestor; and a request augmenter, receiving the request from the input device, and operable to augment the request with augmentation data to assist resource identification. The augmentation data may include position data (for example, current and/or future position data related to the requestor), preference data, and any other useful data. For example, the request augmenter may determine a search area for available resources using a current position, future position (for example, determined using vehicle heading and speed data), or other pertinent preference data. The apparatus may further be in communication with (or include) a search system, the search system receiving the augmented request and the search area from the apparatus and operable to locate available resources within the search area. Available resources may be ranked using the preference data. The apparatus may further comprise an interface, such as a visual display or acoustic device, for presenting highly ranked available resources to the requestor, and a selection mechanism such as a touch screen or microphone/voice recognition system for determining selection(s) made by the requestor.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Having described our invention, we claim:

1. A method for assisting selection of a resource in response to a request from a requestor at a current time, the method being performed by an electronic circuit, the requestor being a driver of a vehicle, the vehicle having a vehicle position, the method comprising:
- augmenting the request with augmentation data, the augmentation data including position data, route plan data, social network data, and traffic data, the position data being the vehicle position;
- identifying available resources by searching a computer network using a wireless connection, the available resources being limited to those in a spatial area determined using the position data;
- ranking the available resources using preference data so as to identify one or more candidate resources, at least part of the preference data being collected from an on-line social network using the wireless connection to the computer network; and
- providing the one or more candidate resources to the requestor, so as to assist selection of the resource,
- the requestor being an occupant of a vehicle, the position data being vehicular position data,
- the request including a time of resource need, the spatial area being determined using the position data and the time of resource need,
- the spatial area being determined using the current time, the time of resource need, and a driving range possible within the time to the resource need determined using the traffic data.

2. The method of claim 1, the position data being obtained from a position sensor in electronic communication with the electronic circuit.

3. The method of claim 1, further including generating some or all of the preference data before the request is made.

4. The method of claim 1, the on-line social network being accessible through the computer network.

5. The method of claim 1, the requestor being a member of the on-line social network, preference data obtained from the on-line social network being weighted according to a network proximity to the requestor.

6. The method of claim 1, the position data being provided by a vehicle navigation system.

7. The method of claim 1, further comprising prompting the requestor to accept or decline each of the one or more candidate resources.

8. The method of claim 7, further comprising making a reservation for each of the one or more candidate resources before prompting the requestor to accept or decline any of the one or more candidate resources.

9. The method of claim 8, further comprising canceling any reservation associated with an explicitly or implicitly declined candidate resource.

10. A method for assisting selection of a resource in response to a request from a requestor, the method being performed by an electronic circuit, the requestor being an occupant of a vehicle, the vehicle having a vehicle position, the method comprising:
- augmenting the request with augmentation data, the augmentation data including position data, route plan data, social network data, and traffic data, the position data being the vehicle position;
- identifying available resources within a spatial area, the spatial area being determined using a future vehicle position,
- the future vehicle position being determined using vehicle heading data;
- ranking the resource candidates using preference data, the preference data being determined at least in part from an on-line social network; and
- presenting one or more highly ranked resources to the requestor, so as to assist selection of the resource.

11. The method of claim 10, the future vehicle position being determined using the vehicle heading data and a time of resource need.

12. The method of claim 10, the method further including prompting the requestor to accept or decline the one or more highly ranked resources.

13. The method of claim 12, further comprising reserving or purchasing an accepted resource.

14. An apparatus for assisting selection of a resource, the apparatus comprising:
- an interface, including a request input operable to receive a request for the resource, the request including a time of resource need;
- a modem, operable to connect to an information network;
- a clock, providing a time of request; and
- an electronic circuit, operable to augment the request with augmentation data, the augmentation data including position data, route plan data, social network data, and traffic data, the social network data being retrieved from the information network using the modem,
- the electronic circuit being further operable to initiate a search for available resources within a spatial area,
- the electronic circuit being further operable to compare available resources with preference data so as to determine a candidate resource;
- the preference data being determined at least in part from an on-line social network, the on-line social network being accessible through the information network,
- the apparatus being located within a vehicle,
- the spatial area being determined using the time of request, the time of resource need, and a driving range possible within the time to the resource need.

15. The apparatus of claim 14, the apparatus receiving position data from a vehicle navigation system.

16. The apparatus of claim 14, the electronic circuit including a speech synthesizer, the interface including an audio device for audible presentation of the candidate resources.

* * * * *